United States Patent
Fukuda et al.

(10) Patent No.: US 8,838,594 B2
(45) Date of Patent: Sep. 16, 2014

(54) AUTOMATIC METHOD TO SYNCHRONIZE THE TIME-LINE OF VIDEO WITH AUDIO FEATURE QUANTITY

(75) Inventors: Takashi Fukuda, Yokohama (JP); Daisuke Sato, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 11/964,971

(22) Filed: Dec. 27, 2007

(65) Prior Publication Data

US 2008/0162577 A1    Jul. 3, 2008

(30) Foreign Application Priority Data

Dec. 27, 2006    (JP) .................................. 2006-351358

(51) Int. Cl.
*G06F 17/30*    (2006.01)
*G11B 27/10*    (2006.01)

(52) U.S. Cl.
CPC .... *G06F 17/30796* (2013.01); *G06F 17/30265* (2013.01); *G11B 27/10* (2013.01); *Y10S 707/913* (2013.01)
USPC .......................................... 707/736; 707/913

(58) Field of Classification Search
CPC .................... G06F 17/30265; G06F 17/30796; G06F 17/30743; G06F 17/30026; H04N 21/44
USPC ........................... 707/610, 617, 804, 736, 913
See application file for complete search history.

(56) References Cited

U.S. PATENT DOCUMENTS

| | | | | |
|---|---|---|---|---|
| 5,920,572 | A * | 7/1999 | Washington et al. | 370/535 |
| 6,240,137 | B1 * | 5/2001 | Kato | 375/240.26 |
| 6,360,234 | B2 * | 3/2002 | Jain et al. | 715/201 |
| 6,704,930 | B1 * | 3/2004 | Eldering et al. | 725/36 |
| 6,831,729 | B1 * | 12/2004 | Davies | 352/3 |
| 7,346,270 | B2 * | 3/2008 | Yoshio et al. | 386/125 |
| 2002/0051119 | A1 * | 5/2002 | Sherman et al. | 352/1 |
| 2002/0088009 | A1 * | 7/2002 | Dukiewicz et al. | 725/136 |
| 2002/0152318 | A1 * | 10/2002 | Menon et al. | 709/231 |
| 2003/0188317 | A1 * | 10/2003 | Liew et al. | 725/88 |
| 2004/0103446 | A1 * | 5/2004 | Yagi et al. | 725/146 |
| 2005/0198570 | A1 * | 9/2005 | Otsuka et al. | 715/515 |
| 2006/0127052 | A1 * | 6/2006 | Furukawa et al. | 386/96 |
| 2007/0140656 | A1 * | 6/2007 | Ergin | 386/95 |
| 2007/0217623 | A1 * | 9/2007 | Harada | 381/94.1 |

FOREIGN PATENT DOCUMENTS

| | | | | |
|---|---|---|---|---|
| JP | 2000194727 | 7/2000 | ............. | G06F 17/30 |
| JP | 2005-339038 | 12/2005 | ............. | G06F 19/00 |
| JP | 2006311328 | 11/2006 | ............. | G03B 21/00 |

\* cited by examiner

*Primary Examiner* — Jorge A Casanova
(74) *Attorney, Agent, or Firm* — Ido Tuchman; William J. Stock (57) ABSTRACT

An apparatus, method and computer program which synchronizes content data and metadata. The apparatus includes a storage device having metadata including a feature vector of the content data recorded therein; a calculation component which calculates the feature vector from the content data; a search component means which searches for corresponding metadata in the storage device on the basis of the calculated feature vector; and a reproducing component which reproduces the searched out metadata, in synchronization with the content data.

11 Claims, 8 Drawing Sheets

AUTOMATIC METHOD TO SYNCHRONIZE THE TIME-LINE OF VIDEO WITH AUDIO FEATURE QUANTITY

CROSS-REFERENCE TO RELATED APPLICATIONS

This application claims priority under 35 U.S.C. §119 to Japanese Patent Application No. 2006-351358 filed Dec. 27, 2006, the entire text of which is specifically incorporated by reference herein.

BACKGROUND OF THE INVENTION

The present invention relates to identifying a time position of a data stream of multimedia content by using a feature vector of multimedia content data being reproduced.

The prevalence of broadband has lead to a rapid increase in services of distributing multimedia contents such as video images. However, contents with captions or audio descriptions for people with visual and hearing impairments hardly exist. For this reason, in order to improve accessibilities, it is strongly desired that captions or audio descriptions for people with visual and hearing impairments be provided as metadata for video image contents distributed on the Internet. Currently, content providers are not equipped with metadata for captions or audio descriptions in many cases, such that a need has been rapidly increasing for building an infrastructure allowing a third party organization such as volunteers to provide metadata.

However, the current content players do not include a structure to interpret metadata provided by third party organizations. Moreover, since various types of content players are used, it is assumed that a considerable amount of time is needed for all of the content players to implement support for metadata provided by the third party organizations. Normally, since metadata is synchronized with the content by use of time stamps including the starting point of the content as the origin, the playback position of the content player needs to be obtained. However, not all of the playback positions of various kinds of content players can be obtained. For this reason, the problem cannot be sufficiently solved by the attempt to reproduce metadata in synchronization with the content by interpreting the metadata by an external application.

Japanese Patent Application Laid-Open Publication No. 2005-339038 discloses a device which determines a timing to provide a particular service on the basis of a feature vector of media. Here, a certain feature vector, and degree of appropriateness (the degree of appropriateness for providing the specific service) are registered in advance, and the degree of appropriateness is then obtained from the feature vector of media being reproduced. When the degree of appropriateness is greater than a threshold value, the service is provided; in other words, the timing at which an advertisement or the like is to be inserted is determined. Accordingly, the technique disclosed in Japanese Patent Application Laid-Open Publication No. 2005-339038 is to determine whether or not it is appropriate to provide a service, but is not to specify a time stamp of media.

BRIEF SUMMARY OF THE INVENTION

To provide a method and apparatus for specifying a time position of a data stream of multimedia content by using a feature vector of multimedia content data being reproduced.

In order to solve the aforementioned problems, in the present invention, there is proposed an apparatus which synchronizes a content data stream with metadata by use of a feature vector of the content data stream. The apparatus synchronizes content data with metadata, and includes: a storage device having the metadata including a feature vector of the content data recorded therein; a calculation component which calculates a feature vector from the content data, a search component which searches for metadata in the storage device on the basis of the calculated feature vector; and a reproducing component which reproduces the searched out metadata in synchronization with the content data.

According to the apparatus of the invention, it is made possible to provide metadata, and to cause a content data stream to be synchronized with the metadata without processing the content data.

Although the outline of the invention has been described so far as a method, the present invention can be grasped as an apparatus, a program, or a program product. The program product includes, for example, a recording medium having the aforementioned program stored thereon, or a medium which transfers the program.

It should be noted that the outline of the present invention does not list all of the features required for the invention, and other combinations of or sub-combinations of these constitutional elements possibly become the invention.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

DETAILED DESCRIPTION OF THE INVENTION

Figure 1:
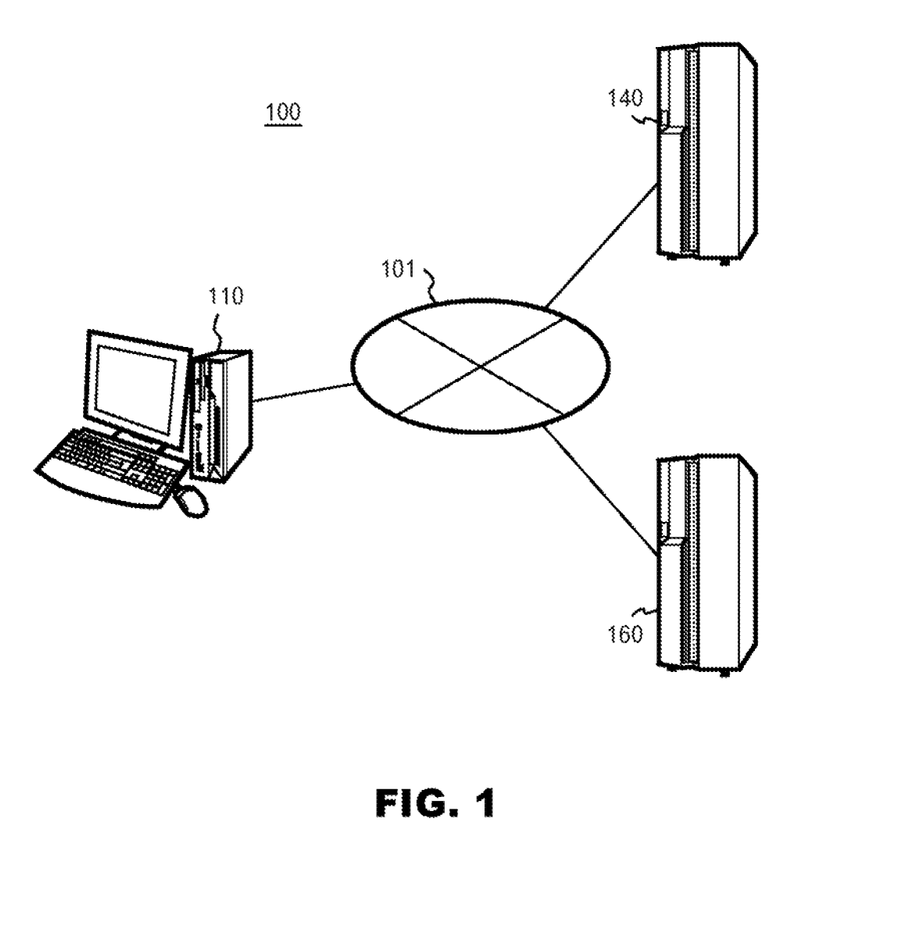
FIG. 1 is an outline diagram of a system of a high level of the present invention, which system specifies a time position of a data stream of multimedia content by use of a feature vector of multimedia content data being reproduced.

FIG. 1 is an outline diagram of a system 100 of a high level of the present invention, which system specifies a time position of a data stream of multimedia content by use of a feature vector of multimedia content data being reproduced. A client terminal 110 downloads metadata and content data via a network 101, and reproduces the data. A meta server 140 provides metadata to the client terminal 110. A content server 160 provides multimedia content data to the client terminal 110. It should be noted that functions of the meta server 140 and content server 160 may exist on the same server.

Figure 2:
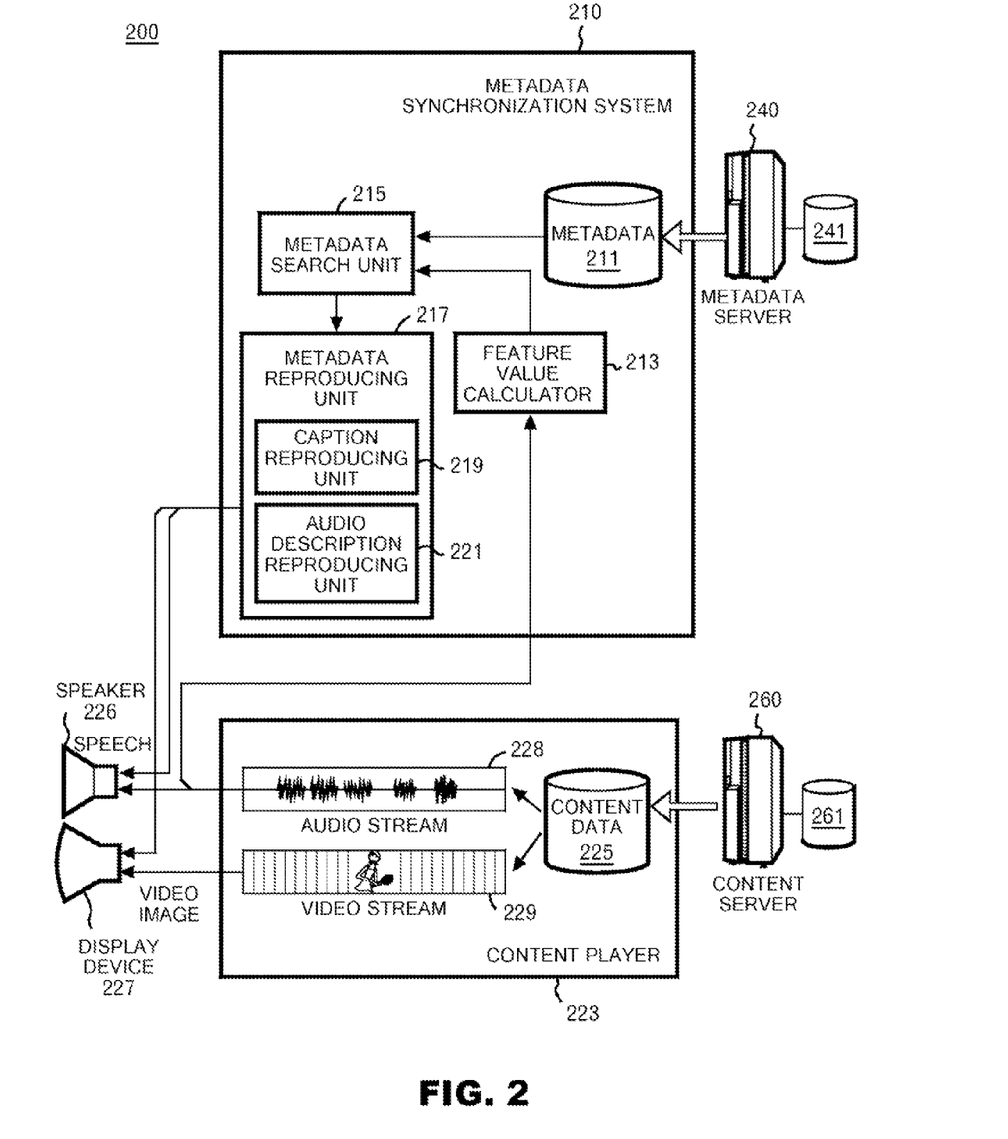
FIG. 2 is a schematic diagram conceptually showing functional blocks of a system which specifies a time position of a data stream of multimedia content by use of a feature vector of multimedia content data being reproduced.

FIG. 2 is a schematic diagram 200 conceptually showing functional blocks of a system which specifies a time position of a data stream of multimedia content by use of a feature vector of multimedia content data being reproduced. The client terminal downloads metadata from a metaserver 240 to a metadata DB (a storage device) 211. Moreover, the client terminal downloads content data from a content server 260 to a content data DB (a storage device) 225. Here, content data 225 includes an audio stream 228, and a video stream 229, and is reproduced by a content player 223.

A metadata synchronization system 210 includes a feature extractor 213. The feature extractor 213 calculates a feature vector from any one of or both of the audio stream 228, and the video stream 229. From the metadata DB 211, a metadata search component 215 searches for metadata having a feature vector corresponding to the calculated feature vector. When the corresponding feature vector is found in the metadata DB as a result of the search, a metadata reproducing component 217 reproduces metadata associated with the feature vector. Here, the metadata reproducing component 217 includes a caption reproducing component 219, and an audio description reproducing component 221 since metadata normally includes captions, and audio descriptions. The reproduced captions, or audio descriptions are respectively output to a speaker 226, and a display device 227 together with the content data stream. It should be noted that in consideration of the search time or the like, the metadata synchronization system 210 preferably processes data by reading them into a buffer memory in advance.

Here, the whole metadata, and whole content data are once downloaded. However, the metadata, and content data may be synchronized with each other while being downloaded little by little as a data stream.

Furthermore, in the case of the present invention, metadata includes data such as: a time stamp; information (caption data, audio description data and the like) to be provided as metadata; data of a feature vector serving as a pointer by the feature vector; and a type of feature vector (information to specify a calculation method of the feature vector). The following is an example of the metadata.

<metadata type="audio-description">
  <time>00:12:23.30</time>
  <description>Hiroshi comes joyfully walking down the street along the river</description>
  <feature type="sound-feature">
    <data type="base64">MDEyMzQ1Njc40TAxMj MONTY30Dk=</data>
  </feature>
</metadata>

The character string enclosed with <data type="base64"> and </data> is data serving as a pointer by the feature vector. This character string is data obtained by replacing the feature vector calculated from the content with a character string in accordance with a constant rule.

Here, data for audio descriptions using an automatic speechreading system is cited as an example. However, captions can also be provided to users by using data for captions.

Incidentally, as a feature vector of a data stream of multimedia content, a feature vector of audio data, and a feature vector of video data are conceivable. As a feature vector of audio data, a mel frequency cepstral coefficient (MFCC), or a linear predictive coding (LPC) mel cepstrum, which is used in a standard automatic speech recognition device, or simply, a log power spectrum, or the like can be used. For example, in a derivation process of an MFCC, first, audio signals of 25 ms time length (normally referred to as frames) are extracted from input audio, and thereafter, a frequency analysis is performed on the signals. Subsequently, an analysis is performed by a 24 channel bandpass filter (BPF) having a center frequency following the mel scale. Then, an output of the resultant BPF group is subjected to discrete cosine transform to obtain an MFCC. Here, the mel scale is an interval scale based on human pitch perception with respect to high and low audio frequencies, and the value thereof substantially corresponds to the logarithm value of the frequency. An MFCC calculated by the frame is a vector having 12 components (a 12 dimensional vector). The following are some examples of a feature vector of a video image: a feature of shape, which indicates an area or a circumference length of an object; temporal variation of a feature of a pixel tone; and a velocity vector image (optical flow) of each point on a screen.

Figure 3:
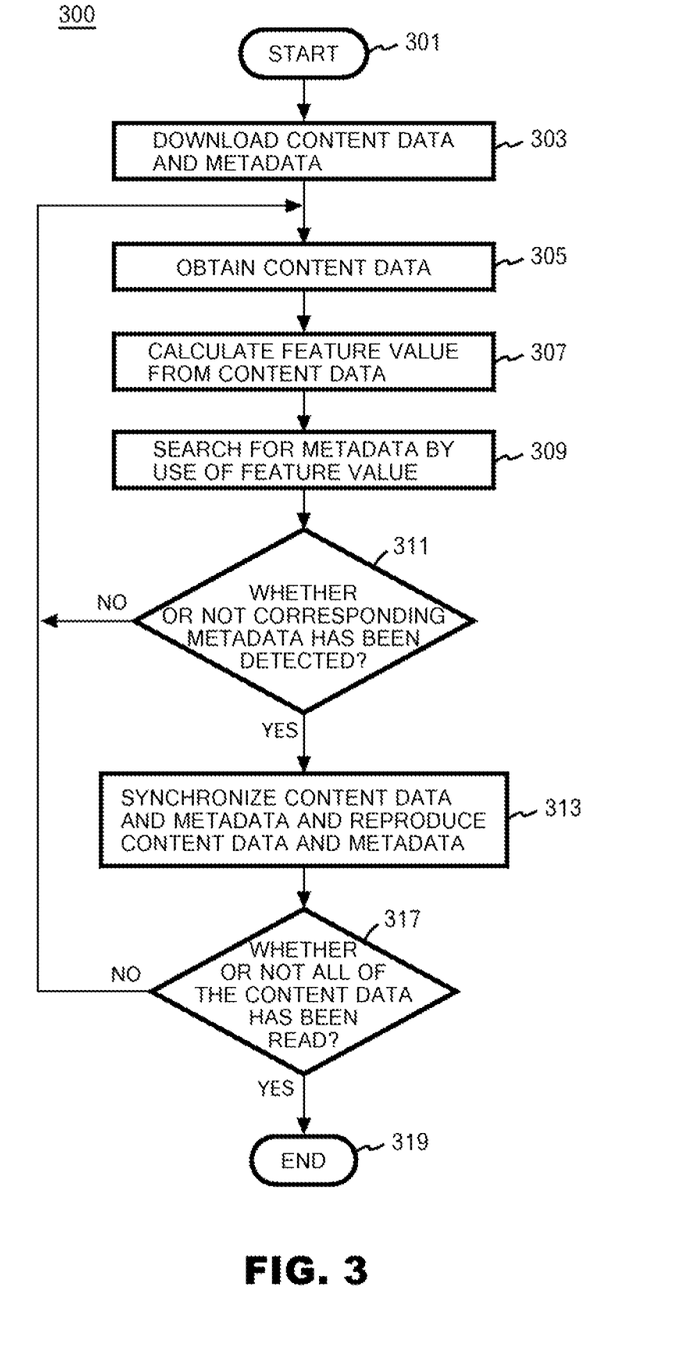
FIG. 3 shows an example of a process flow according to the present invention, the process specifying a time position of a data stream of content by use of a feature vector of multimedia content data being reproduced.

FIG. 3 shows an example of a process flow 300 according to the present invention, the process specifying a time position of a data stream of content by use of a feature vector of multimedia content data being reproduced. The process begins in step 301. In step 303, content data, and metadata are downloaded. In step 305, the content data are obtained. Here, part of data may be obtained from the content data when it is appropriate, or data may be obtained in relation to the information stream being reproduced. In step 307, a feature vector is calculated from the content data.

In step 309, metadata is searched for, by use of the feature vector calculated in step 307. In the search for metadata, an Euclidean distance between the feature vector obtained in step 307 and the feature vector in the metadata, or a likelihood ratio found on the basis of a probability model can be utilized. In step 311, as a result of the searching in step 309, it is determined whether or not corresponding metadata is detected. In step 311, in a case where it is determined that the corresponding metadata cannot be detected (No), the process returns to step 305 where content data are newly obtained, to repeat the search for metadata. On the other hand, in a case where it is determined that metadata is detected in step 311 (Yes), the process proceeds to step 313. In step 313, the content data and metadata are synchronized with each other to be reproduced. In such a case as where the content data are read in advance, adjustment is to be made in synchronizing the already read content data.

In step 317, it is determined whether or not all of the content data has been read. In step 317, in a case where it is determined that all of the content data has not been read (No), the process returns to step 305 where content data are newly obtained, to repeat the search for metadata. On the other hand, in a case where it is determined that all of the content data has been read in step 317 (Yes), the process proceeds to step 319, and the process ends. It should be noted that it is possible to configure the process to proceed to step 319 and end the process also in the case where all of the metadata has been detected in step 317, in addition to the case where it is determined that all of the content data has been read.

Figure 4:
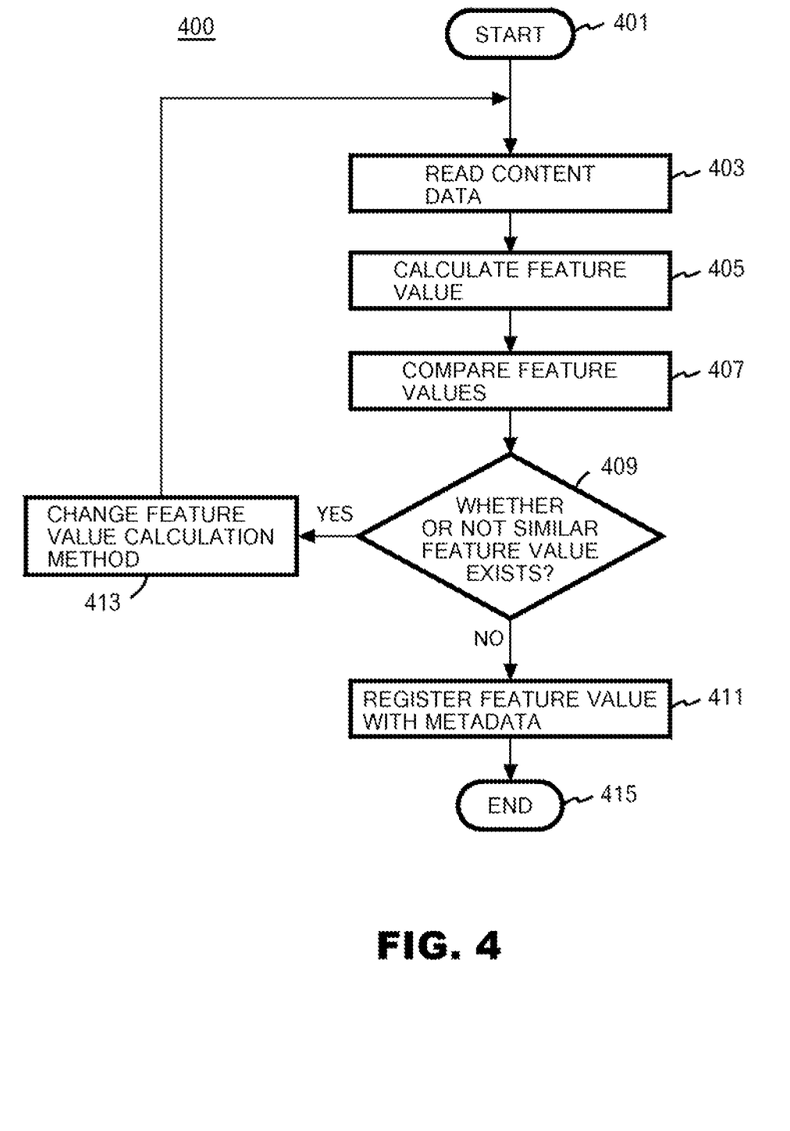
FIG. 4 exemplifies a process flow in which a feature vector is created from original content data, and is set as the metadata.

FIG. 4 exemplifies a process flow 400 in which a feature vector is created from original content data, and is set as the metadata. When a feature vector is found at a plurality of locations in the content as the pointer (search key), the feature vector no longer serves as a pointer with respect to the metadata. Accordingly, the calculation and setting of the feature vector become very important.

The process flow 400 begins in step 401. In step 403, the content data are partially read. In step 405, feature vectors are calculated. In step 405, among a plurality of feature vector calculation methods, one or some of the plurality of feature vector calculation methods are previously selected. In step 407, the plurality of feature vectors calculated in step 405 are compared with one another.

In step 409, it is determined whether or not similar feature vectors exist, which determination is based on the result of comparison in step 407. In a case where it is determined that similar feature vectors exist (Yes) in step 409, the process proceeds to step 413. In step 413, alternative calculation methods are employed, where the process returns to step 403 to repeat the calculation of feature vectors. An alternative calculation method may include the use of a different calculation formula, or an alternation in the acquisition time of content data for calculating a feature vector. On the other hand, in a case where it is determined that similar feature vectors do not exit (No), the process proceeds to step 411, where the feature vectors are registered as the pointers (search keys). Thereafter, the process proceeds to step 415, and ends the process.

It should be noted that whether or not the calculated feature vector is one with which a certain scene in the video image can be uniquely specified can be examined by calculating matching with the entire video image. Accordingly, it is easily understandable for those skilled in the art that the examination of the uniqueness of a feature vector is not limited to the process flow 400.

Figure 5:
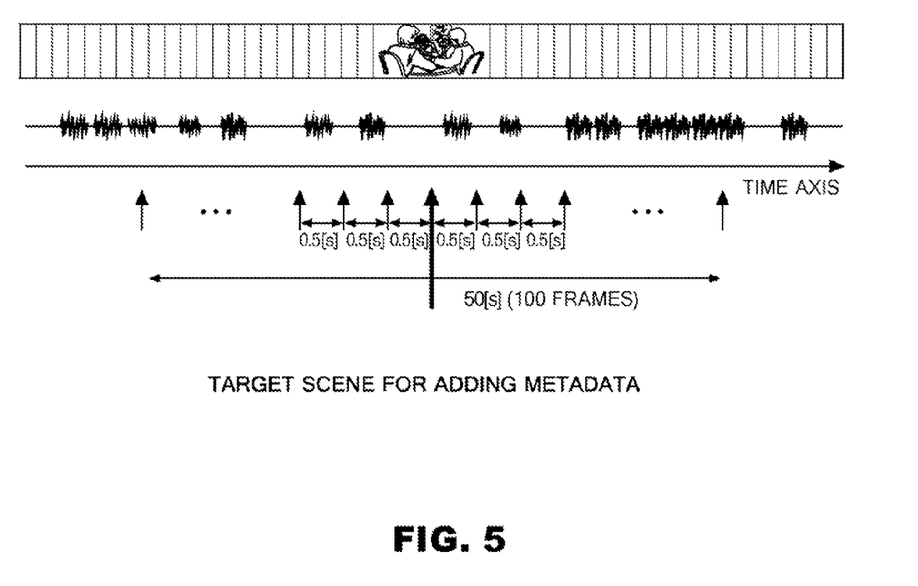
FIG. 5 exemplifies a method for handling a case where a scene, which is similar to another, repeatedly appears in the content.

FIG. 5 exemplifies a method for handling a case where similar scenes repeatedly appear in the content. When metadata of a scene with similar background music is created by chance, for a content including scenes with similar background music throughout the content, a matching failure is likely to occur when applying metadata. For example, the same sound effect or same scene may be repeatedly used in a content as in a case where the same background music is used at the beginning of a news broadcast every time. In order to support such content, data obtained by extracting feature vectors for 100 frames proportionally from audio signals for 50 seconds with the specified scene as the center, and then by combining the feature vectors is added to the metadata as the information for specifying the scene. Thereby, matching errors in applying metadata are reduced. Moreover, the broadening of intervals of frames leads to the reduction in size of metadata. Intervals for calculating a feature vector as the metadata, how many frames to combine, or the like should be selected appropriately in accordance with the program (scene).

Figure 6:
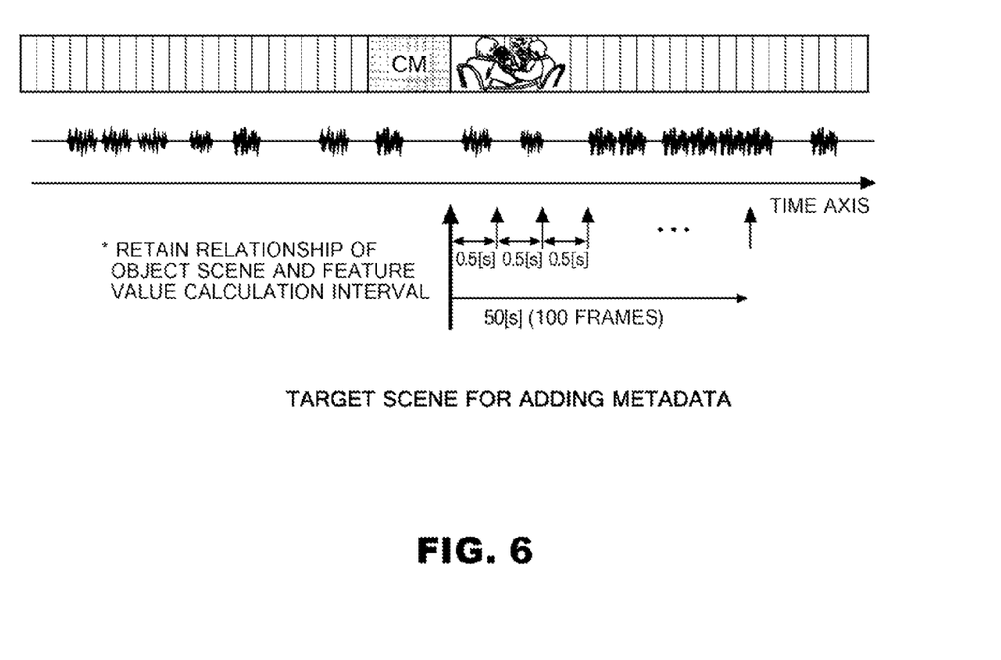
FIG. 6 exemplifies a method for handling a case where a commercial message (CM) is different according to a user preference in a streaming broadcast using a broadband network.

FIG. 6 exemplifies a method for handling a case where a different commercial message (CM) is used according to a user preference in a streaming broadcast using a broadband network. When a feature vector of audio including a CM portion is added to metadata, in some cases, the feature vector does not match the recorded video content when a user applies the metadata. In order to avoid such a case, the feature vector is selected excluding a CM portion by use of a CM detection technique, or by adding a mark on a CM portion manually in the video image during the stage of creating a feature vector. For example, when the target scene is before or after the CM, instead of extracting a feature vector from 50 seconds of signals having the target scene as the center, a feature vector is extracted from 50 seconds of audio signals, starting immediately before or after the CM. The problem with a CM portion can be resolved by calculating the position of extracting metadata, and a positional relationship of the target scene relative to time, concurrently, and then retaining them as the metadata. The same process is used for a portion immediately after the beginning or a portion before the end of a program. In these cases, information about the relationship of calculation intervals is preferably retained together as the metadata.

Furthermore, when a feature vector used is extracted in broader intervals than time intervals used in a general automatic speech recognition system, the original data cannot be restored from the feature vector. Thus, problems concerning copyright are reduced. Specifically, by use of the so-called mel log spectrum approximation (MLSA), original audio signals can be restored from a feature vector of audio (time-series data of MFCC), in a quality with which a person can at least understand what is spoken although the signals are somewhat deteriorated. When a feature vector of audio to be added as metadata is calculated from continuous frames, there possibly occurs a problem, namely, an unauthorized copy from the viewpoint of copyright since the audio signals can be restored. However, by use of feature vectors extracted with constant intervals as shown in the example, the audio signals cannot be restored. Thus, problems concerning copyright can be reduced.

Figure 7:
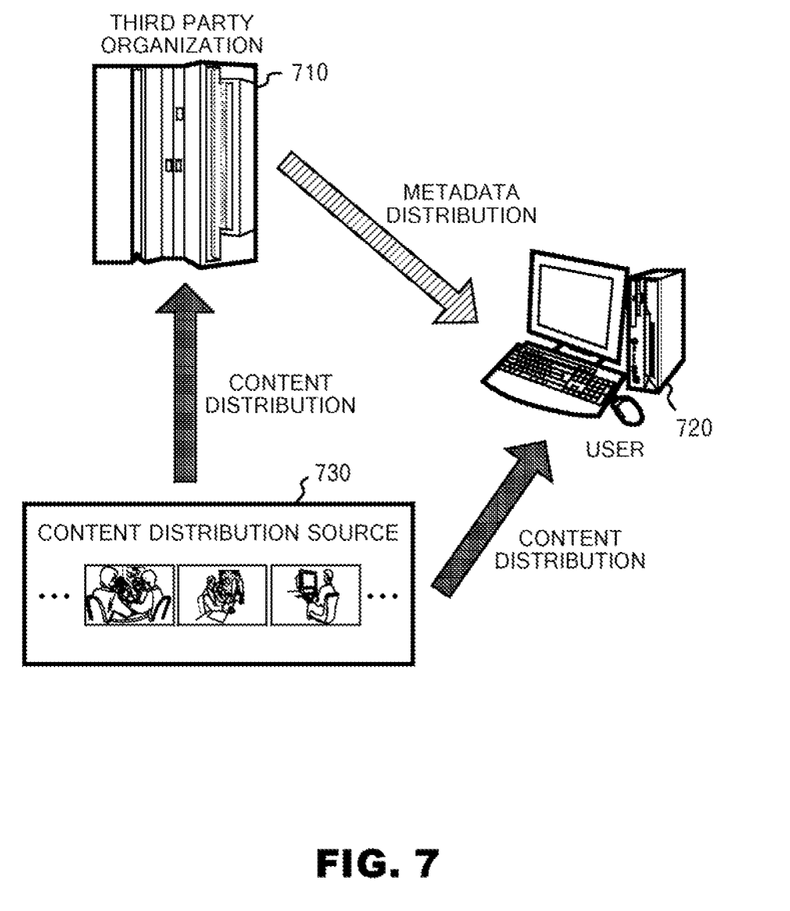
FIG. 7 shows an example in which the present invention is applied to a multimedia browser for people with visual and hearing impairments.

FIG. 7 shows an example in which the present invention is applied to a multimedia browser for people with visual and hearing impairments. A content distribution source 730 creates content data such as a program or the like, and transmits the data to a user 720 and a third party organization 710. The third party organization 710 obtains permission from the content distribution source, or creates metadata for the program in a legally permissible range, and then distributes the data to users. The third party organization 710 selects scenes from the content data, extracts feature vectors, and adds the amounts to the metadata. The user 720 downloads content data from the content distribution source 730, and downloads metadata corresponding to the content data from the third party. The user then calculates the feature vector of the content data, which is used in searching metadata. Consequently, the user detects the part of metadata corresponding to the feature vector of the content data. Thus, the metadata is applied to the detected part, to be reproduced together with the content data.

Figure 8:
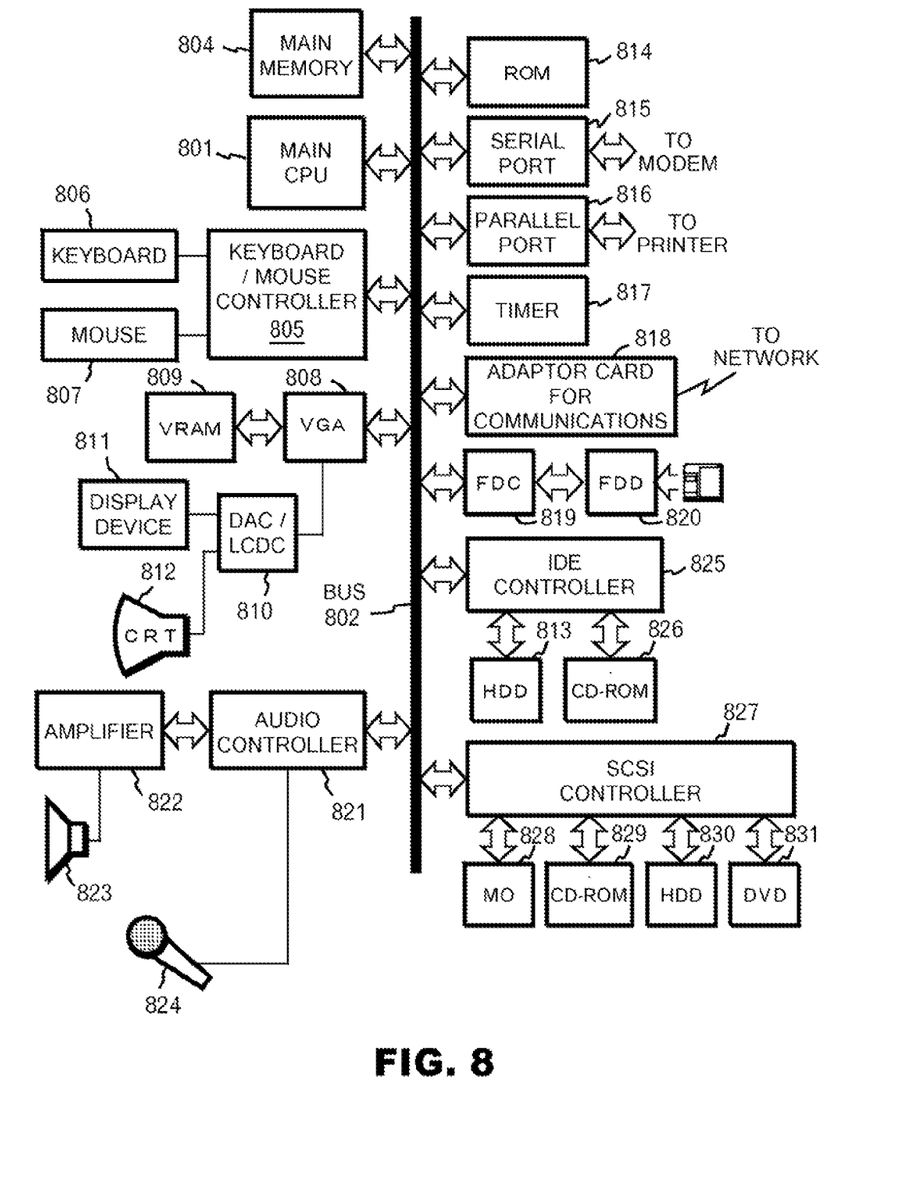
FIG. 8 is a diagram showing an example of a hardware configuration of an information processing apparatus preferably used to implement the client terminal, the metadata server, and the content data server according to the embodiment of the present invention.

FIG. 8 is a diagram showing an example of a hardware configuration of an information processing apparatus preferably used to implement the client terminal 110, the metadata server 140, and the content data server 150 according to the embodiment of the present invention.

The information processing apparatus includes a CPU (central processing unit) 801, and a main memory 804 connected to a bus 802. Removable storage devices (media-exchangeable external storage systems) such as hard disk drives 813 and 830, CD-ROM drives 826 and 829, a flexible disk drive 820, an MO drive 828, and a DVD drive 831 are connected to the bus 802 via a Floppy® disk controller 819, an IDE controller 825, a SCSI controller 827, or the like.

Recording media such as a flexible disk, an MO disc, a CD-ROM disc, and a DVD-ROM disc are inserted in a removable storage device. Computer program codes for implementing the present invention by providing commands to the CPU or like in corporation with an operating system can be stored in these recording media or the hard disk drives 813, or 830, or a ROM 814. The computer program is executed by being loaded on the main memory 804. The computer program may be compressed, or be divided into multiple pieces and then, stored in multiple media.

The information processing apparatus receives an input from an input device such as a keyboard 806, or a mouse 807 via a keyboard/mouse controller 805. The information processing apparatus is connected, via a DAC/LCDC 810 to a display device 811 for displaying visual data to users.

The information processing apparatus is capable of communicating with another computer or the like by being connected to a network via a network adapter 818 (an Ethernet® card, or a token ring card) or the like. The information processing apparatus is also capable of being connected to a printer, or a modem via a parallel port 816, or a serial port 815, respectively.

By the descriptions which have been provided so far, it is to be easily understood that the information processing apparatus preferably used for implementing the system according to the embodiment of the present invention is implemented by a general information processing apparatus such as a personal computer, a workstation, or a main frame, or a combination of these. However, the constitutional elements of these apparatuses are mere examples, and not all of the constitutional elements are necessarily required constitutional elements of the present invention.

As a matter of course, various modifications including combination of each hardware constitutional element of the information processing apparatus used in the embodiment of the present invention, or multiple machines, and allocation of functions thereto can be easily conceived by a person skilled in the art. Needless to say, such modifications are within the concept included in the spirit of this invention.

The system according to the embodiment of the present invention employs an operating system, which supports a graphical user interface (GUI) multi-window environment, such as Windows® operation system provided by Microsoft Corporation, MacOS® provided by Apple Computer Inc., and Unix® system including X Window System (for example, AIX® provided by International Business Machines Corporation).

From the descriptions provided so far, it can be understood that the system used in the embodiment of the present invention is not limited to a specific operating system environment. Specifically, any operating system can be employed as long as the operation system is capable of providing a resource management function which allows an application software program or the like to utilize a resource of a data processing system. It should be noted that the resource management function possibly includes a hardware resource management function, a file handling function, a spool function, a job management function, a storage protection function, a virtual storage management function, or the like. However, the descriptions of these functions are omitted here since they are well known to those skilled in the art.

Moreover, the present invention can be implemented by means of a combination of hardware components, or software components, or a combination of hardware and software components. As a typical example of an implementation by means of a combination of hardware and software components, an implementation by a data processing system including a predetermined program can be cited. In this case, the program controls, and causes the data processing system to execute the processing according to the present invention. This program is constituted of command sets which can be described by an arbitrary language, code, or description. Such command sets allow the system to execute a specific function directly or after any one of, or both of, 1. conversion into another language, code, or description, and 2. copy to another medium are performed.

As a matter of course, the present invention not only includes such a program itself, but also a medium having the program recorded thereon in the scope of the invention. A program causing a system to execute the functions of the present invention can be stored in an arbitrary computer-readable recording medium such as a flexible disk, an MO disc, a CD-ROM disc, a DVD disc, a hard disk drive, a ROM, an MRAM, or a RAM. Such program can be downloaded from another data processing system connected to a communications line, or can be copied from another recording medium for the purpose of storing the program in a recording medium. Furthermore, such program can be compressed, or divided into multiple pieces, and then be stored in a single medium or multiple recording media. In addition, it should be noted that as a matter of course, it is also possible to provide a program product in various form which implements the present invention.

From the descriptions provided, according to the embodiment of the present invention, it is understood that a system which backs up resource data of a web server on a client, and which recovers data from resource data backed up in the client in a case where the resource data of the web server is damaged, can be easily built.

Hereinabove, the present invention has been described by using the embodiment. However, the technical scope of the present invention is not limited to the above-described embodiment. It is obvious to those skilled in the art that various modifications and improvements may be made to the embodiment. Moreover, it is also obvious from the scope of the present invention that thus modified and improved embodiments are included in the technical scope of the present invention.

That which is claimed is:

1. An apparatus which synchronizes content data and metadata, comprising:
    a computer processor;
    a storage device having the metadata associated with a feature vector of the content data recorded therein, the content data including an audio stream and a video stream, the metadata providing a description of the content data and is separate from the content data;
    a calculation component which calculates a feature vector from the at least one of the audio stream and the video stream of the content data;
    a search component which searches, on the basis of the calculated feature vector, for corresponding metadata from the storage device, the corresponding metadata including a feature vector value corresponding to the calculated feature vector and at least one of captions and audio descriptions for the content data; and
    a reproducing component which reproduces the at least one of captions and audio descriptions from the searched out metadata, in synchronization with the content data.

2. The apparatus according to claim 1, wherein the metadata includes a time stamp.

3. The apparatus according to claim 1, wherein the calculation component which calculates a feature vector calculates the feature vector by reading the content data before the content data are reproduced.

4. The apparatus according to claim 1, wherein the feature vector value included in the metadata is calculated avoiding a commercial message portion of the content data.

5. The apparatus according to claim 1, wherein the feature vector value included in the metadata is a feature vector extracted from the content data at constant time intervals.

6. A method for synchronizing metadata with content data, comprising:

storing the metadata associated with a feature vector of the content data in a storage device, the content data including an audio stream and a video stream, the metadata including at least one of caption data and audio description data;

calculating a feature vector from the at least one of the audio stream and the video stream of the content data;

searching, on the basis of the calculated feature vector, for corresponding metadata from the storage device, the corresponding metadata including a feature vector value corresponding to the calculated feature vector and at least one of captions and audio descriptions for the content data; and reproducing the at least one of captions and audio descriptions from the searched out metadata, in synchronization with the content data.

7. The method according to claim 6, wherein the metadata includes a time stamp.

8. The method according to claim 6, wherein in the step of calculating a feature vector, the feature vector is calculated by reading the content data before the content is reproduced.

9. The method according to claim 6, wherein the feature vector value included in the metadata is calculated avoiding a commercial message portion of the content data.

10. The method according to claim 6, wherein a feature vector value included in the metadata is extracted from the content data at constant intervals.

11. A computer program embodied in non-transitory computer usable medium for synchronizing metadata with content data, the computer program comprising computer code for:

storing the metadata associated with a feature vector of the content data in a storage device, the content data including an audio stream and a video stream, the metadata including a time stamp;

calculating a feature vector from the at least one of the audio stream and the video stream of the content data;

searching, on the basis of the calculated feature vector, for corresponding metadata from the storage device, the corresponding metadata including a feature vector value corresponding to the calculated feature vector and at least one of captions and audio descriptions for the content data; and reproducing the at least one of captions and audio descriptions from the searched out metadata, in synchronization with the content data.

* * * * *